United States Patent [19]

Escaravage et al.

[11] Patent Number: 4,938,914

[45] Date of Patent: Jul. 3, 1990

[54] RETENTION DEVICE FOR A SAFETY BELT BAND OF MANUALLY ADJUSTABLE POSITION

[75] Inventors: Gerard Escaravage, Valentigney; Michel Henriot, Hericourt; Antoine Negri, Herimoncourt, all of France

[73] Assignee: ECIA - Equipements Et Composants Pour L'Industrie Automobile, Audincourt, France

[21] Appl. No.: 254,642

[22] Filed: Oct. 7, 1988

[30] Foreign Application Priority Data

Oct. 7, 1987 [FR] France .................................. 87 13866
Feb. 10, 1988 [FR] France .................................. 88 01599

[51] Int. Cl.$^5$ ............................................ B60R 22/20
[52] U.S. Cl. .................................................. 280/808
[58] Field of Search ................. 280/801, 808; 297/483

[56] References Cited

U.S. PATENT DOCUMENTS

| | | | |
|---|---|---|---|
| 4,469,352 | 9/1984 | Körner et al. | 280/808 |
| 4,572,544 | 2/1986 | Cunningham et al. | 280/808 |
| 4,611,825 | 9/1986 | Patterson | 280/808 |

Primary Examiner—Charles A. Marmor
Assistant Examiner—Tamara L. Finlay
Attorney, Agent, or Firm—Sughrue, Mion, Zinn, Macpeak & Seas

[57] ABSTRACT

The device comprises a body (20) intended to be fastened to a structure (10). This body possesses a base (21) having, cut out from it, a slot (210) with cutouts (212). A band support (50) is secured to the body by a journal (60). This journal consists of a butt (61), a shank (62) and an endpiece (63). By rotating the journal, it is possible to make it pass from one cutout to the other.

The invention is used for the guidance of the band.

17 Claims, 3 Drawing Sheets

RETENTION DEVICE FOR A SAFETY BELT BAND OF MANUALLY ADJUSTABLE POSITION

BACKGROUND OF THE INVENTION

The present invention relates to safety belts for a passenger transport vehicle, especially a land vehicle and its subject is, more particularly, a retention device for a safety belt band of manually adjustable position and intended to be fastened to a structure.

As is known, for safety reasons, passenger transport vehicles are conventionally provided with seats equipped with a safety belt. This is true, for example, of aircraft and motor vehicles.

Where motor vehicles are concerned, safety belts with two or three anchoring points are conventionally used. When a safety belt with three anchoring points is used, the band comprises a pelvic strand and a pectoral strand which passes across the wearer's chest in the manner of a shoulder belt.

When a safety belt of this latter type is used, the pectoral strand occupies a position relative to its wearer which depends both on his build, the geometry of the vehicle and the seat and also on the state of fatigue of the latter. Under these conditions, in some cases, the pectoral strand can be level with the wearer's neck. It will therefore be appreciated that, in the event of a violent collision, since the safety belt is immobilized under the control of an inertia detector, the passenger's body is flown violently forwards and his neck encounters the band which can then behave no longer as a safety means, but as an especially dangerous object. In fact, in some collisions, it has been possible to find serious lesions of the neck caused by the safety belt and, more particularly, its pectoral strand.

Consequently, there has already been a proposal to ensure that the upper fastening point of the pectoral strand is of adjustable position, in order to allow for the wearer's build in comparison with the configuration of the vehicle.

Various devices have already been proposed. They are very often of such a configuration that the upper fastening point of the pectoral strand can occupy multiple positions within a range, the extent of which takes into account the extreme builds of a population in comparison with its average build.

These devices which are sometimes motorized are extremely complicated. They often resort to screw-and-nut mechanisms which thus make it possible to vary progressively the position of the upper fastening point of the pectoral strand.

Other embodiments make use of pawls and holes, relative to which movable-carriage mechanisms are shifted.

Other alternative embodiments utilize locking mechanisms equipped with a latch and with a keeper.

It will therefore be appreciated that all these devices are complicated and therefore unreliable and of relatively high cost.

SUMMARY OF THE INVENTION

The invention proposes to provide a retention device for a safety band of manually adjustable position and intended to be fastened to a structure, which does not have this type of disadvantage and which is relatively simple and of relatively modest production and installation cost.

The subject of the invention is a retention device for a safety band of manually adjustable position and intended to be fastened to a structure, which comprises, among other things, a body with a base pierced with a slot and mounts for anchoring to the structure and also of a band support associated with a body and movable relative to the latter. This device is such that the base and the anchoring mounts are arranged so as to form a recess at the rear of the slot, the slot is equipped, at least at each of its ends, with at least partially circular cutouts, the diameter of which is greater than the width of the slot, and the band support pierced with an orifice and the body are associated by means of a journal which consists of a butt having at least one dimension larger than that of the cutouts, of a shank and of an endpiece carrying fastening means. This device is notable in that the cross-section of the shank has, over its entire length, a non-circular contour inscribable in the cutouts and with two orthogonal transverse axes, one, the major axis, being exactly equal to the diameter of the cutout and the other, the minor axis, being exactly equal to the width of the slot, the shank normally being oriented so that its major axis is not parallel to the slot, and in that the endpiece carries gripping members. The device is designed in such a way that the butt is seated in line with the recess, the shank passes through the body and the band support is engaged by means of its orifice on the journal and is fastened there by the retaining means, so that when the journal engaged in a cutout is deliberately made to rotate on its axis by means of the gripping members, the major axis is made parallel to the slot so that the journal can be shifted there together with the band support.

Other characteristics of the invention will emerge from a reading of the following description and claims and from an examination of the accompanying drawing which is given purely by way of example and in which:

DETAILED DESCRIPTION OF A PREFERRED EMBODIMENT

Since safety belts and the arrangements intended for their assembly, in particular safety belts for a motor vehicle, are well known in the art, the following description will be limited to what relates directly or indirectly to the invention. For the rest, the specialist in the technical sector in question can draw from the conventional solutions available to him, in order to deal with the special problems which he has to solve.

This can be seen from the figures of the drawing, the invention relates to a retention device for a safety belt band of manually adjustable position, which is intended to be fastened to a structure or shell 10 of a vehicle.

More particularly, the structure part in question is the central pillar or middle foot which is located between the front and rear side doors of a four-door vehicle.

The device according to the invention comprises among other things, a body 20, a band support 50, a journal 60 and, if appropriate, a cover 170.

The structure or shell 10 is equipped with an aperture 11, and with a hole 12, the functions of which will be dealt with later.

The body 20 of the general shape of a stirrup comprises a base 21 and two anchoring mounts 22. Each anchoring mount 22 comprises a branch 221 which is virtually perpendicular to the base 21 and which terminates on the side of its free end in a rim 222. This stirrup shape provides a recess 211 at the rear of the base 21. As shown, the base 21 is pierced with a longitudinal slot 210, provided with a cutout 212 at least at each of its two ends.

As illustrated, the cutouts 212 are at least partially circular, and their diameter is greater than the width of the slot 210. In the embodiment illustrated, only two cutouts are made at the ends of the slot, but it is clear, that depending on the particular length of the body and according to requirements, it is possible to make other intermediate cutouts at specific intervals, for example equidistant.

As emerges from an examination of the figures, the band support 50 comprises a frame 51 pierced with an orifice 52 and is equipped with a reinforcement 53. A passage 54 for a band, not shown, is formed in the frame. This band preferably passes freely through this passage where it can travel.

The band support 50 is secured to the body 20 by means of a journal 60. This can be seen clearly illustrated in the figures, the journal 60 is composed of a butt 61, a shank 62 and an endpiece 63, with which are associated retaining means and gripping members.

As can be seen in the figures, the butt 61, circular- and disc-shaped in this embodiment, has at least one of its dimensions larger than those of the cutouts 212, so that when it is engaged in the recess 211 it cannot pass through the slot 210.

The shank 62 is produced in such a way that its cross-section has a non-circular contour indescribable in the cutouts, and so as to have two orthogonal transverse axes, one, the major axis, being exactly equal to the diameter of the cutout and the other, the minor axis, being exactly equal to the width of the slot. For example, this shank is cylindrical and two diametrically opposed flats 621 are made on it, as shown.

The endpiece 63 is equipped with retaining means consisting, for example, of a thread 631 onto which a nut 632 is screwed.

This endpiece is also equipped with gripping members which will be discussed later. These gripping members are associated with the journal in such a way as to be integral with the latter in terms of rotation, so that when the gripping members are tilted along the longitudinal axis of the journal, the latter is driven in rotation.

Figures 1, 2:
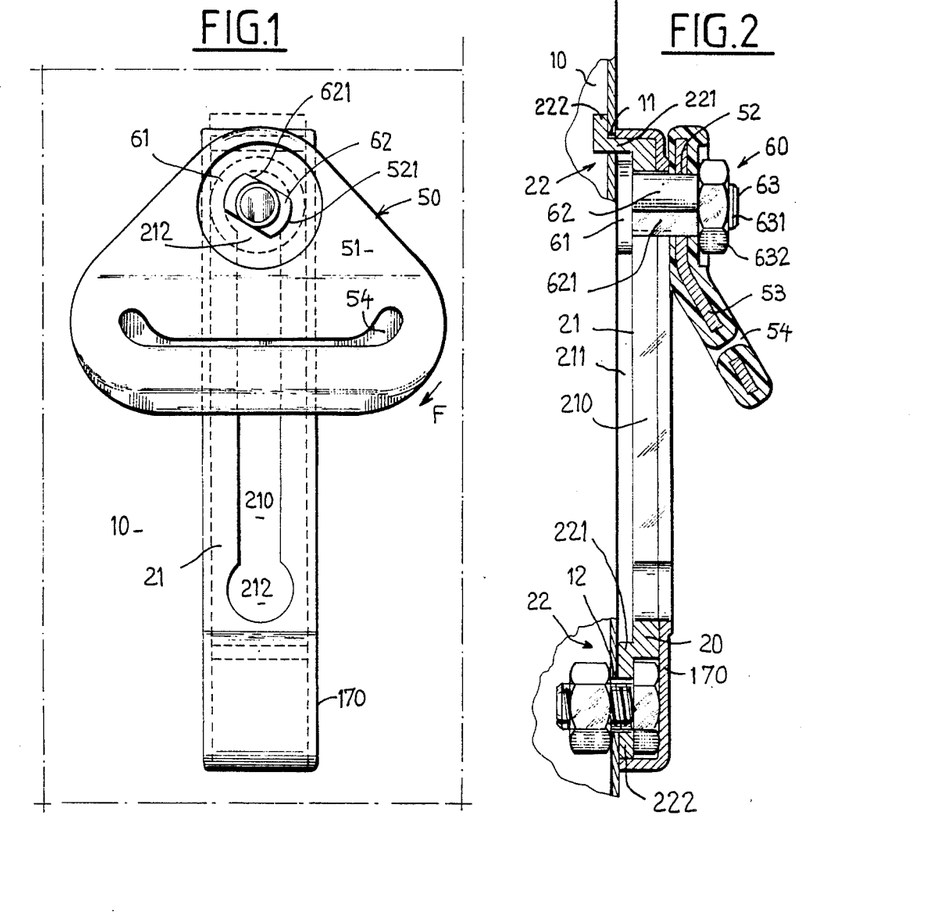
FIG. 1 is a front view of an embodiment of a device according to the invention.
FIG. 2 is a longitudinal section through FIG. 1.

The body 20, the band support 50 and the journal 60 are assembled, as illustrated particularly in FIG. 2.

An examination of FIG. 1 shows that, for the normal orientation of the band support, for example as a result of gravity, the major transverse axis of the shank of the journal is inclined relative to the longitudinal axis of the slot.

Because of the relative dimensions given to the 5 butt and to the shank of the journal, on the one hand, and to the cutouts and the slot of the base on the other hand, it will be seen that, when the band support occupies its normal position, the journal is trapped in one of the cutouts and it can rotate there through a specific angle which is a function of the inclination of the major transverse axis of the shank of the journal relative to the longitudinal axis of the slot, without being capable of disengaging from it. It will thus be appreciated that, when the journal is deliberately made to rotate by means of the gripping members, the major transverse axis of the shank can be given an orientation parallel to that of the major axis of the slot and the journal can then shift in the latter so as to leave the cutout in which it is engaged and reach the other cutout, where, after it has resumed its normal orientation, the band support is thus retained.

In this embodiment, the gripping members are merged with the band support. For this purpose, the orifice 52 is given a profile 521 matching that of the shank 62 of a cross-section of non-circular contour. Thus, when the band support 50 is engaged on the shank 62 and immobilized by means of the nut 632, it is sufficient to grasp the band support and tilt it in the direction of the arrow F of FIG. 1 in order to shift it from one position to the other.

Instead of adopting a solution such as that illustrated, it is clear that the band support can be mounted so as to be capable of rotating relative to the journal, and that the endpiece of the latter can be equipped with a gripping member, for example by replacing the hexagonal nut 632 shown with a wing nut.

It is clear that the relative dimensions ensure sufficient play to allow easy tilting and translational movement.

Preferably, the body 20 is made of metal and the band support 50 is formed by a frame 51 made of synthetic material, in which a metal reinforcement 53 is embedded, as shown.

The device according to the invention is subject to the structure as shown by way of example: it is seen that in this solution one of the rims 222 of an anchoring base is engaged into the opening 11 of the structure and that the other rim, also pierced by a hole, not referenced, is maintained by virtue of a bolt, not referenced, engaged into the hole 12, as illustrated by way of example.

For aesthetic reasons, if appropriate, the device according to the invention is equipped with a suitable cover 170 made, for example, of plastic. In such a case, the body 20 previously equipped with its journal 60 is first fastened to the structure 10, then the cover is put in place, the band support is engaged and the retaining means are fitted.

In this embodiment, two cutouts have been drawn at each of the ends of the slot, but it is clear that others can be provided between these so as to have intermediate positions.

This reveals the great usefulness of the invention which makes it possible to obtain a retention device for a safety band of manually adjustable position, which comprises a minimum number of components and which functions very simply and reliably and is of acceptable production and assembly costs.

However, such an embodiment can present operating problems. In fact, since its slot is exposed over most of its length, foreign bodies can enter there and subsequently impede or prevent the shift of the journal in order to adjust the position of the band. In addition to such inconvenience, it can happen that children playing insert keys or other objects into it, thus risking causing disruption.

Figure 3:
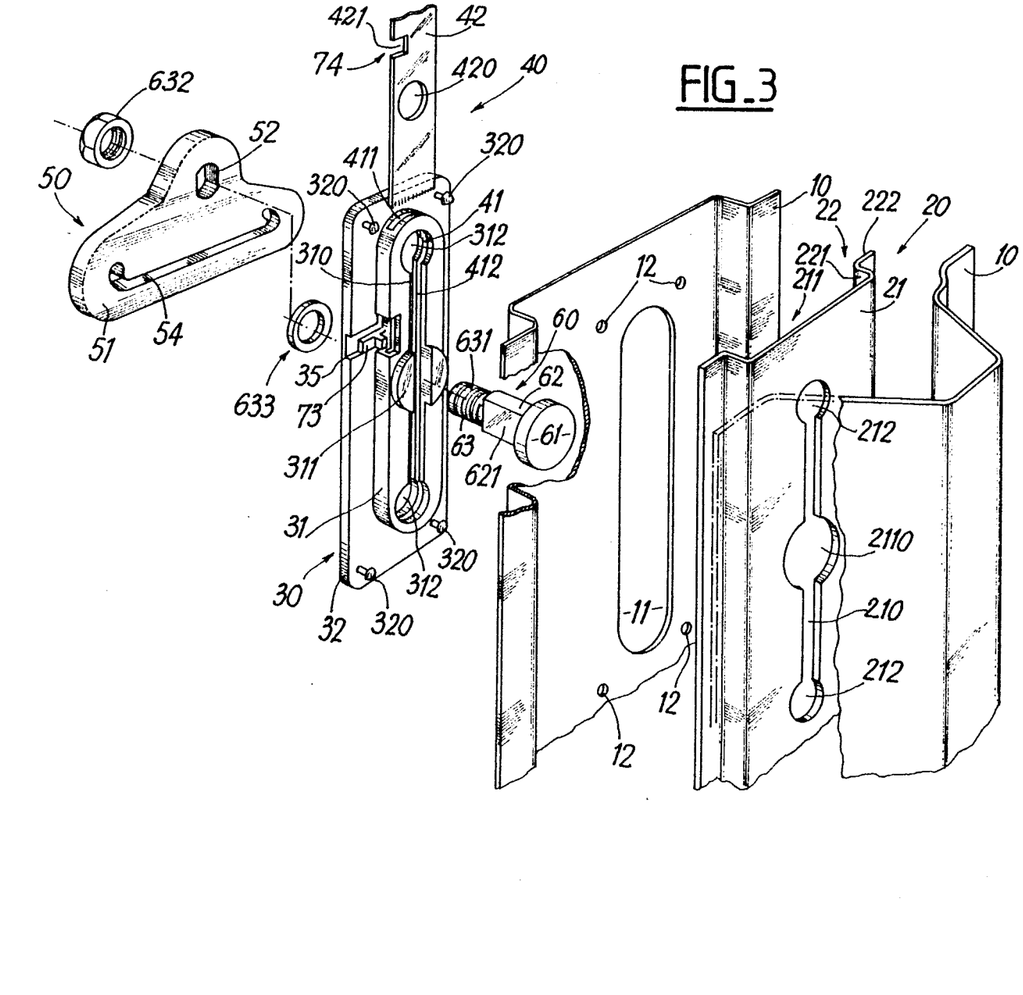
FIG. 3 is an exploded perspective view of another embodiment of a device according to the invention.
Figure 4A:
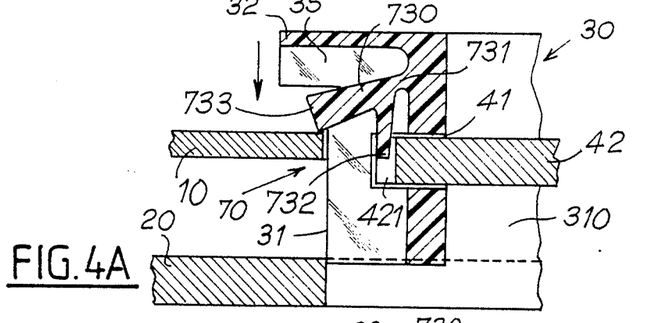
FIG. 4A and 4B are detailed views of the locking mechanism of FIG. 3, making it possible to understand its functioning.
Figure 4B:
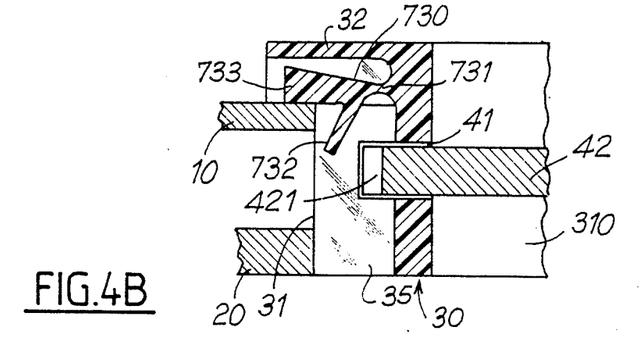
Figure 5:
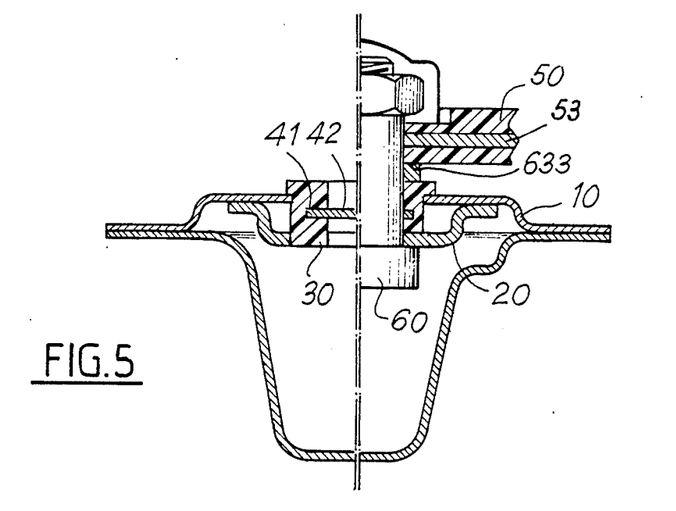
FIG. 5 is a cross-section through the device according to FIG. 3, once it has been installed on the structure, taken where the half-view on the right is a section through the transverse axis of a cutout and where the half-view on the left is a section through the transverse axis of the aperture.

Another embodiment illustrated in FIG. 3, 4 and 5 has been developed in order to overcome this type of inconvenience.

As emerges more clearly from the cross-section of FIG. 5, here the structure 10 takes the form of, for example, a hollow column formed, for example, from two approximately U-shaped beams coupled head to foot to one another in such a way that their respective concavities face one another. This type of hollow column obtained from mechanically welded stamped metal sheets is conventional in the motor-vehicle industry.

This other embodiment of the device according to the invention comprises, among other things, a body 20, a spacer 30, a protection system 40, a band support 50, a journal 60 and a locking mechanism 70.

Each of these components will now be described.

As can be seen particularly in FIG. 3, one of the beams of the structure 10 is pierced with an oblong clearance 11 and with holes 12 which will be dealt with later.

The body 20 of the general shape of a stirrup comprises a base 21 edged with two anchoring mounts 22.

The base 21 is pierced with a longitudinal slot 210 where an aperture 2110 and at least two cutouts 212 are made. The aperture 2110 and the cutouts 212 are preferably circular and of different dimensions, the aperture 2110 being larger than the cutouts 212 for the reasons which will be explained later.

As illustrated, the mounts 22 have branches 221, virtually perpendicular to the base 21 and terminating in rims 222 virtually parallel to the plane of the base. As a result of this stirrup shape, a recess 211 is formed on one side between the mounts 22 and a corresponding projection is formed in line with the slot 210 and on the opposite side.

In this embodiment, only two cutouts 212 have been shown, but it is clear that, depending on the particular length of the body and the slot made in the latter, it is possible to use other cutouts distributed uniformly or non-uniformly between the two ends of the slot.

As can be seen clearly in FIG. 3, the spacer 30 comprises a bed 31 associated with a plate 32.

The bed 31 which projects on one of the faces of the plate 32 has a contour matching that of the clearance 11, in which it can engage relatively easily with very little play, in such a way that when the plate 32 is up against the structure 10 the bed 31 bears at least partially against the body 20, as emerges clearly from an examination of FIG. 5.

The bed 31 is pierced with a slot 310 and with cutouts 312, the dimensions and relative arrangement of which correspond virtually identically to those of the slot 210 and of the cutouts 212 made in the body 20. The bed also carries a protuberance 311 on the opposite side to the plate 32. The dimensions of this protuberance 311 are such that it can engage virtually without play into the aperture 2110, in such a way that when it is in place it does not protrude on the opposite face of the body 20, as emerges from the half-section on the left in FIG. 5; the projection of the protuberance 311 on the bed 31 is at most equal to the thickness of the body 20.

A lateral receptacle 35 is also formed in the bed 31 and the plate 32 for a reason which will appear later. This receptacle is intended for receiving part of the locking mechanism 70.

The device according to the invention also possesses a protection system 40.

This protection system is composed of an incision 41 made in the spacer 30 and more especially in the bed 31. This incision 41, which is virtually parallel to the plane of the plate 32, comprises exits 411 which pierce through the bed 31 in the axial extension of the slot 311 and which appear on its contour, and lateral grooves 412 which open into the slot 311 on each of its large sides, as emerges particularly from FIG. 3.

This protection system is also composed of a strip 42 which is relatively flexible and elastic so that it can be bent or curved at least momentarily and in which are formed a port 420 and a notch 421 which will be dealt with later. This strip is normally engaged in the incision 41 so as to be capable of sliding freely there. Preferably, the length of this strip is at least equal to double the length of the bed 31 for a reason which will appear clearly later. The port 420 is intended for receiving the shank 62 of the journal 60, which will be mentioned later; the shank can rotate freely in the port.

The strip 42 is produced, for example, from a metal ribbon or from a band of synthetic material, such as, for example, polyethylene glycol terephthalate of the type known in the trade by the name of "mylar".

The device according to the invention also possesses a band support 50. In the embodiment described, this band support 50 is in fact preferably the guide which allows a band, not shown, to change direction so that its pectoral strand returns to a reeling mechanism. It is clear that this band support, instead of being a guide, can be such that the band, instead of being capable of sliding there, is fastened permanently there, without the capacity for shifting relative to it.

This band support 50 is composed of a frame 51, a mounting orifice 52, a reinforcement 53 and a band passage 54. A band, not shown, normally passes freely through the passage 54, as is conventional.

As is customary, the band support 50 is formed by a frame 51 preferably made of synthetic material in which, for example, metal reinforcement 53 is embedded, as illustrated.

The device according to the invention also possesses a journal 60.

This journal comprises a butt 61, a shank 62 and an endpiece 63.

The butt 61 takes the form of a disc, the diameter of which allows it to engage relatively freely into the aperture 2110 of the body, but does not allow it to disengage from or come out of the cutouts 212 and 312 by passing through them, whatever the particular orientation of the journal.

The shank 62 of non-circular cross-section has, for example, two orthogonal axes of different lengths, which are such that the shank on the one hand can rotate relatively freely in the cutouts 212 and 312 and on the other hand can slide relatively freely in the slots 210 and 310 when its major axis is parallel to that of these slots, its minor axis being of a dimension at most equal to the width of the slots 210 and 310. The shank 62 is, for example, cylindrical and two diametrically opposed flats 621 have been formed on it.

The endpiece 63 carries, for example, a thread 631 intended for receiving, for example, a nut 632 and a washer 633 which together form retaining means.

For aesthetic reasons, a cap is placed over the retaining means and fits onto them, for example elastically.

Such a cap, not bearing a reference, is shown in the half-view on the right in FIG. 5.

The device according to the invention also possesses preferably, but not necessarily, a locking mechanism 70 which is composed of a latch 73 and a keeper 74.

The keeper 74 is associated with a strip and consists, for example, of the notch 421 cut out along a longitudinal edge of the latter, as shown in FIG. 3.

The latch 73 is associated with the spacer 30 and is arranged so as to occupy the receptacle 35 (see FIG. 4 for details). This latch 73 consists of a catch 730 connected to the bed 32 by means of a joint 731: this catch 730 has a nose 732 intended for engaging into the notch 421 and a stay 733 intended to come to rest against the structure 10 (see FIG. 4B).

The catch 730 is movable between an active position, where its nose 732 is engaged in the notch 421 of the strip, in order to immobilize it (FIG. 4A) and an inactive position, where this nose is separated from the notch of the strip in such a way as to release the latter so that it can slide in the incision when the stay rests against the structure (FIG. 4B).

The spacer 30 also carries a fastening 320 intended for reacting with the holes 12 in the structure 10. This fastening is formed, for example, by elastic snap-in studs consisting of a split pin terminating in a conical shouldered head, as shown diagrammatically in FIG. 3.

The journal 60 is also intended for receiving gripping means which make it possible to rotate it on its axis, so that it can be made to slide in the slots 210 and 310 to cause it to pass it from one pair of cutouts 212 and 312 to another, in order to change the position of the band support.

The mounting orifice 52 of the band support 50 is intended for receiving the journal and especially its shank 62. The profile of this mounting orifice 52 preferably matches the profile of the shank 62, so that when the band support is grasped, the journal can be made to tilt together with it. In this case, the band support itself serves as a gripping member. Otherwise, the band support can be mounted loosely on the journal, the profile of the mounting orifice then allowing it to rotate freely relative to the shank and/or to the end-piece; in this case, for example a wing nut 632 which then serves as a gripping member is used. The cap is then suitably adapted to it.

The device according to the invention is such that the spacer 30, the journal 60 particularly and also, if appropriate, the band support 50, the protection system 40 and the retaining means and gripping members are joined together to form an independent unit which, for example, is removable and which is preferably assembled separately to form a subassembly which is subsequently attached and fastened to the structure equipped independently of the body 20.

The body 20 is associated with the structure 10 in such a way as to be arranged inside the hollow column, as emerges clearly from FIG. 5, and be fastened there, for example by spot-welding.

The relative positionings of the body 20 and of the structure 10 are such that the clearance 11 and the slot 210 are in line with one another, so that, when the spacer 30 is placed on the structure and the bed 31 engaged into the clearance 11, the slot 310, the protruberance 311 and the cutouts 312 of the spacer 30 are as strictly as possible aligned and coinciding respectively with the slot 210, the aperture 2110 and the cutouts 212 of the body 20.

It can therefore be seen that the body fastened to the structure follows the latter on its travels during treatments for protection against corrosion in particular and during the final painting which it undergoes.

The body 20 of the device according to the invention has no element visible or projecting on the outside of the structure 10. It will therefore be appreciated that it causes no obstruction of any kind whatever.

For assembling the subassembly formed by the unit composed particularly of the spacer 30, of the band support 50, of the journal 60 and of the protection system 40, the following procedure is adopted.

The strip 42 is engaged into the incision 41 by introducing it via the upper exit 411, for example, and it is made to slide there until its notch 421 engages with the nose 732 of the locking mechanism 70. Should the strap 42 be engaged through the opposite exit 411, the relative position of notch 421 and port 420 would be reversed.

The relative positions of the notch 421 and of the port 420 which are made in the striP 42 are such that, when the strip is immobilized by the locking mechanism 70, the port 420 is centered on the protuberance 311.

The suitably directed journal 60 is then engaged by ensuring that the major axis of its shank 62 is parallel to the slot 310, and it is made to pass through the port 420 of the strip until its butt 61 rests against the protuberance 311.

The washer 633 is then slipped on, followed, if appropriate by the band support 50, care being taken to ensure that its mounting orifice 52 engages correctly onto the shank 62, and then the nut 632 is placed on the thread 631 of the endpiece 63 and tightened in order to immobilize the assembly as a whole.

The dimensions of the shank 62 are selected so that, when the nut is tightened normally, there is virtually no axial play. To achieve this effect, the washer 633 is, for example, an elastic washer.

When there is no need for the journal to be equipped immediately with the band support and the nut, the band support being connected to the actual band, for example, the washer 633 is selected in order also to ensure clamping on the journal, so that the components connected in this way remain joined together, without the risk that they will separate spontaneously from one another.

Once this has been done, it will be seen that the result is a unit of which all the components are immobilized relative to one another, since the journal in particular remains in a position, in which its butt 61 is up against the protuberance 311 as a result of the action of the locking mechanism 70 which occupies the position of FIG. 4A.

It is then sufficient to offer this unit to the completed structure by engaging the bed 31 into the clearance 11, whilst at the same time bending the ends of the strip 42 which project from the exits 411 in order to make them enter the clearance 11 beforehand. If this procedure is followed, the fastening 320 also engage into the holes 12. If the entire assembly is pressed together, the plate 32 comes to rest against the structure 10, and the fastenings, after snapping in, expand and keep the entire assembly in place, if necessary permanently and unremovably. At the same time, the stay 733 of the catch 730 has come in contact with the structure and the catch has tilted by means of its joint 731 so as to leave its position of FIG. 4A and assume the position shown in FIG. 4B: the nose 732 has disengaged from the notch 421 and the strip 42 is released; the strip and everything associated with it can now slide freely in the slots, if the journal and particularly its shank are suitably oriented in relation to these.

It will thus be seen that the preassembled unit is now secured to the structure.

The locking mechanism 70 has passed from its active position of FIG. 4A to its inactive position of FIG. 4B where it is neutralized. The locking mechanism 70 is thus inactivated, and since the strip 42 is no longer retained, the gripping means, here the band support 50 in this embodiment, can be grasped in order to shift them towards one or the other of the pairs of cutouts. In so doing the journal slides into the slot and when it reaches one or the other of the pairs of cutouts it is made to tilt, if it does not tilt by itself under the action of gravity and/or of the band tension.

When this takes place, its major axis no longer remains aligned with that of the slots and the journal can rotate in the cutouts. When it is rotated through a certain angle, the shank 62 is seated in a pair of cutouts and can no longer come out of them.

If the band support is now to be placed in another pair of cutouts, it is sufficient to repeat the operation in reverse order, that is to say to rotate the journal on itself so as to realign its major axis with that of the slot 8, then shift the assembly as a whole and, once the journal is in the other pair of cutouts, ensure that it rotates through a certain angle so that it is retained there once again.

Since the dimensions of the protuberance 311 are such that it does not project from the body 20 when the spacer 30 is finally put in place, the butt 61 can travel freely in line with the recess 211 of the body without being impeded.

To assist movability and allow easy sliding, if expedient suitable anti-friction washers are arranged at the appropriate locations in order to prevent direct metal/metal contact. Such a washer is placed, for example, between the butt 61 and the base 21. For example, washers made of or covered with polytetrafluoroethylene currently known by the name of "Teflon" are used.

It is clear that the protection system 40 and/or the locking mechanism 70, with which the device according to the invention has been equipped are not indispensable and can be present or absent.

If a locking mechanism 70 is not used, assembly is somewhat more difficult since the exact position which the journal must assume so that its butt 61 is in line with the aperture 2110 has to be located by trial and error. Fastening is less rapid and less automatic.

The protection system 40 is likewise not indispensable. If it is omitted, some of the disadvantages mentioned above return.

The great usefulness of the device according to the invention and all the advantages which it affords will therefore be appreciated, since final assembly can be carried out "blind" on a production line, part of the device having been constructed and connected in the form of a unit constituting a subassembly which can easily be installed either manually or automatically by means of robots, automatic mechanisms or the like.

The way in which the spacer is fastened to the structure can be different. Instead of using a fastening distributed in the vicinity of each of the corners of the plate 32 forming part of the spacer, it is possible, for example, to employ rivets of the type known as "pop" rivets, which can also be installed blind.

Preferably, the spacer 30 is produced from a material which can easily be moulded, for example, a suitable plastic having some flexibility and elasticity at least in the region of the joint 731, so that the catch, before final mounting on the structure remains in the position in which it is shown in FIG. 4A. In fact, as can have been seen, this component is used virtually only for mounting, since it subsequently undergoes no force. It will be seen that, if a safety belt had to perform its function in the event of sudden deceleration, all the forces which are transmitted by the band to the band support are retransmitted by the latter to the journal, the butt of which is always up against the body 20. This body 20 is preferably produced from a relatively thick metal sheet of a size and grade allowing it to absorb considerable forces which are subsequently suitably distributed over the structure via its mounts.

As a result of the relative dimensions given to the butt and to the shank of the journal 60 on the one hand and to the cutouts, slots and aperture of the spacer 30 and of the body 20 on the other hand, it can be seen that, when the band support occupies its normal position, the latter is trapped in one of the pairs of cutouts and can rotate there through a specific angle which is a function of the inclination of the major transverse axis of the shank of the journal relative to to the longitudinal axis of the slots, without being capable of disengaging.

It will therefore be appreciated that, when the journal is deliberately made to rotate by means of the gripping members, the major transverse axis of the shank can be given an orientation parallel to that of the major axis of the slots, and the journal can then shift in these so as to leave the cutouts, in which it is engaged, and reach other cutouts where, after it has resumed its normal orientation, the band support is thus retained.

It is clear that the relative dimensions ensure easy tilting and translational movement.

The safety afforded by the invention, especially the embodiment of FIGS. 3, 4 and 5, can be improved even further.

In fact, in the event of an accident, a violent pull is exerted on the band and transmitted to the journal 60, the butt 61 of which transmits the force to the body 20. If this force reaches or exceeds a certain value, the body 20 can be deformed in such a way that the butt 61 of the journal can escape.

To prevent this, the edges of the slot 210 are equipped with wings which extend them by projecting on the same side of the butt; these wings are obtained, for example, by bending the base 21 at right angles in the opposite direction to the branches 221. The base 21 is also given relief shapes, preferably in the form of an arc of a circle, which partially surround the cutouts 212 on the same side as the butt 61 of the journal 60; these shapes, for example obtained by stamping, are intended for ensuring a good support for the butt. Furthermore, if necessary, the branches 221 of the body 20 are also provided with stamped portions in the form of a dish directed towards the outside of the body; these stamped portions, which are formed on each of the branches 221 preferably approximately in line with the cutouts 212, are intended for increasing its rigidity.

In order to allow for the height of these projecting wings and these relief shapes, the length of the shank 62 of the journal 60 and, if appropriate, the length of the protuberance 311 of the spacer 30 are increased by the amount of this height.

As a result of these additional arrangements, it will be appreciated that, if too high a force is exerted by the butt of the journal on the body, the latter is deformed in the direction of the structure 10. During this deformation, the base 21 of the body 20 comes nearer to the structure by bending approximately along the connecting line of the branches 221 to the rims 222, and the projecting wings which are then inclined towards the longitudinal axis of the slot 210 clamp onto the shank 62 of the journal 60, since they are pressed against the shank 62 by the butt 61 which bears on their free edge. This prevents the butt 61 from coming out via the cutout 212: the configuration of these additional arrangements is "self-closing".

The foregoing makes it possible to grasp all the advantages afforded by the device according to the invention both in terms of simplicity and in terms of comfort and safety.

What is claimed is:

1. Retention device for a safety-belt band of manually adjustable position and intended to be fastened to a structure (10) and, comprising, among other things, a U-shaped body (20) with a base (21) pierced with a slot (210) and mounts (22) for anchoring to the structure (10) and of a band support (50) associated with the body (20) and movable relative to the body, in which the base (21) and the anchoring mounts (22) of the body are arranged so as to form a recess (211) opposite the slot (210), and the slot (210) is equipped, at least at opposite ends thereof, with partially circular cutouts (212), the diameter of which is greater than the width of the slot (210), and in which the band support (50) pierced with an orifice (52) and the body (20) are associated by means of a journal (60), which consists of a butt (61) having at least one dimension larger than that of the cutouts, of a shank (62) and of an endpiece (63) carrying retaining means (631, 632), the device being characterized in that the cross-section of the shank has, over its entire length, a non-circular contour inscribable in the cutouts, with two orthogonal transverse axes, one, a major axis, being exactly equal to the diameter of the cutout and the other, a minor axis, being exactly equal to the width of the slot (210), the shank normally being oriented so that its major axis is not parallel to the slot (210), in that the retaining means carried by the endpiece (63) comprises a gripping member, and in that this journal (60) is engaged within said slot (210) to be movable in translation and in rotation and is arranged in such a way that the butt (61) is seated in line with the recess (211), and the shank (62) passes through the body (20) and the band support (50) which is engaged there by means of its orifice (52) and is factened there by the retaining means, so that, when the journal (60) engaged in one of said cutouts (212) is deliberately made to rotate by means of the gripping member, the major transverse axis is made parallel to the slot (210) so that the journal (60) can be shifted therein together with the band support (50).

2. Device according to claim 1, characterized in that the body (20) has the shape of a stirrup where the anchoring mounts (22) possess a branch (221) perpendicular to the base (21) and terminating in a rim (222).

3. Device according to claim 2, characterized in that the shank (62) takes the form of a cylinder with two diametrically opposed flat$ (621).

4. Device according to claim 1, characterized in that the orifice (52) of the band support (50) has a profile (521) matching that of the contour of the shank (62), so that the band support (50) is integral with the journal (60) in terms of rotation and serves as said gripping member.

5. Device according to claim 1, characterized in that the fastening means consist of a thread (631) of the endpiece (63) and of a nut (632).

6. Device according to claim 1, characterized in that the band support (50) is pierced with a passage (54) which a band can pass through freely and in which the band can travel.

7. Device according to claim 1, characterized in that the structure (10) is pierced with a clearance (11), in that the slot (210) has, in addition to the successive cutouts (212) an aperture (2110), the dimension of which is at least equal to that of the butt (61), in order to allow the passage of the butt, in that said device possesses a spacer (30) made of a plate (32) which is associated with a bed (31), the dimension of which makes it possible to insert said bed (31) into the clearance (11), and which is pierced with a slot (310) and with cutouts (312) virtually identical to those of the body (20) and intended to be placed in coincidence with these, and which is equipped with a protuberance (311), the dimension of which is at most equal to that of the aperture (2110), to allow the protuberance to fill the aperture, and in that the spacer (30) is intended to be arranged in such a way that its plate (32) rests against the structure (10) and its bed (31) is engaged into the clearance (11), so that slots and cutouts of the body (20) and of the spacer (30) are respectively in line with one another, and so that the protuberance (311) occupies the aperture (2110), and in that the journal (60) is intended to be arrange din such a way that the butt (61) can be placed opposite the recess (211), and the shank (62) can pass through the structure (10), the body (20), the spacer (30) and the band support (50) which can be engaged there by means of its orifice (52) and fastened there by the retaining means, so that, when the journal (60) engaged in a pair of cutouts (212, 312) is deliberately made to rotate by means of the gripping member, the major transverse axis is made parallel to th e slots (210, 310) so that the journal can shift therein together with the band support (50).

8. Device according to claim 7, characterized in that the body (20) is intended to be made integral with the structure (10), and in that at least the spacer (30), the journal (60) and, if necessary, the band support (50) form an independent unit attached to the structure (10).

9. Device according to claim 8, characterized in that the end ependine unit (30, 60) is intended to be placed blind on the structure (10) in order to be connected to the body (20).

10. Device according to claim 7, characterized in that the orifice (52) in the band support (50) has a profile (521) matching that of the contour of the shank (62), so that the band support (50) is integral with the journal (60) in terms of rotation and serves as said gripping member.

11. Device according to claim 7, characterized in that the spacer (30) is equipped with a protection system (40) for preventing foreign bodies $ from entering the device.

12. Device according to claim 11, characterized in that the spacer (30) is provided with an incision (41) oriented virtually parallel to the plate (32) and opening into the slot and onto the contour of the bed (31), that a strip (42 is mounted slidable in the incision (41) and pierced with a port (420) for the free passage of the shank (62) of the journal (60), and that the length of said strip is at least equal to twice the length of the bed (31).

13. Device according to claim 12, characterized in that it possesses a locking mechanism (70) with a latch (73) associated with the spacer (30) and a keeper (74) associated with the strip (42).

14. Device according to claim 13, characterized in that the latch (73) comprises a catch (730) which has a joint (731), a nose (732) and a stay (733) and which is movable between an active position, in which the latch immobilizes the strip (42) relative to the spacer (30), and an inactive position, in which the latch is neutralized and frees the strip (42) and the spacer (30) from one another.

15. Device according to claim 7, characterized in that it possesses a fastening (320) for keeping the spacer (30) in place on the structure (10).

16. Device according to claim 15, characterized in that the fastening (320) comprises at least one elastic snap-in stud intended to engage into a hole (12) in the structure (10).

17. Device according to claim 7, characterized in that the base (21) is equipped, on its face intended for receiving the butt (61) of the journal (60), with projecting wings on the edges of the slot (210) and with relief shapes which partially surround the cutouts (212).

* * * * *